(12) United States Patent
Matey

(10) Patent No.: US 7,574,021 B2
(45) Date of Patent: Aug. 11, 2009

(54) IRIS RECOGNITION FOR A SECURE FACILITY

(75) Inventor: James R. Matey, Princeton, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 11/857,432

(22) Filed: Sep. 18, 2007

(65) Prior Publication Data

US 2008/0199054 A1    Aug. 21, 2008

Related U.S. Application Data

(60) Provisional application No. 60/845,487, filed on Sep. 18, 2006.

(51) Int. Cl.
G06K 9/00    (2006.01)

(52) U.S. Cl. ........................ 382/117; 382/115

(58) Field of Classification Search ................. 382/117, 382/115
See application file for complete search history.

(56) References Cited

U.S. PATENT DOCUMENTS

| 7,428,320 | B2* | 9/2008 | Northcott et al. ............ 382/117 |
| 2004/0088584 | A1* | 5/2004 | Shachar et al. .............. 713/201 |
| 2006/0245623 | A1 | 11/2006 | Loiacono et al. |
| 2006/0274918 | A1 | 12/2006 | Amantea et al. |

* cited by examiner

*Primary Examiner*—Wesley Tucker
(74) *Attorney, Agent, or Firm*—Lowenstein Sandler PC

(57) ABSTRACT

A method of performing iris recognition from at least one image, comprising: using a plurality of cameras to capture a plurality of images of a subject where at least one of said images contains a region having at least a portion of an iris; and processing at least one of said plurality of images to perform iris recognition; identifying the subject by the iris recognition; determining the security level of the subject from the subject's identity; and modifying the display of a computer system in a secure information facility based on the security level of the subject.

21 Claims, 4 Drawing Sheets

US 7,574,021 B2

IRIS RECOGNITION FOR A SECURE FACILITY

CROSS REFERENCE TO RELATED APPLICATION

This application claims the benefit of U.S. Provisional Patent Application No. 60/845,487 filed, Sep. 18, 2006, the contents of which is hereby incorporated by reference herein.

FIELD OF THE INVENTION

Embodiments of the invention relate generally to providing secure access to classified data on the basis of users' biometric identification.

BACKGROUND OF THE INVENTION

In many scenarios of interest to the government, intelligence and military communities it is necessary to provide access to classified information at varying levels of classification. In many scenarios, this access is provided on computer displays that are housed in areas to which people with varying level of classification must have access. This creates business process difficulties: if user A is working at a first security level (e.g., TS level) and user B, who has a second, lower security level (e.g., S level clearance) walks into the area, how do we make sure that the TS information that user A has access to will not be seen by user B?

Thus, there is a need for an improved systems and methods for providing secure access to classified data on the basis of users' biometric identification.

SUMMARY OF THE INVENTION

Embodiments of the invention can include systems and methods of providing secure access to classified data on the basis of users' biometric identification.

Embodiments of the invention combine a virtual secure compartmentalized information facility (VSCIF) with the iris recognition technologies to provide secure access to classified data on the basis of users' biometric identification.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention.

DETAILED DESCRIPTION OF THE INVENTION

Figure 1:
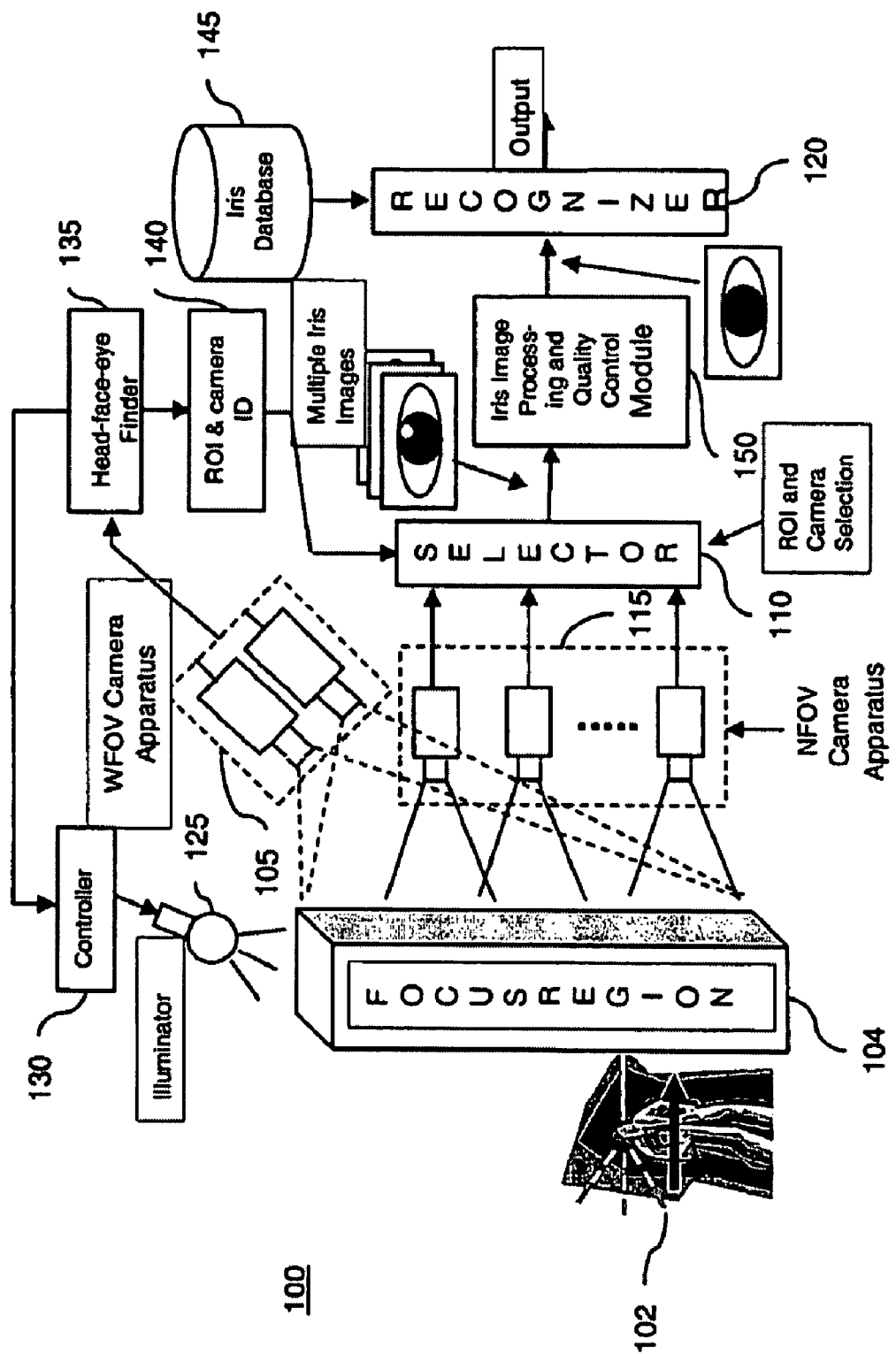
FIG. 1 illustrates an iris sensing and acquisition system according to one embodiment of the present invention.

FIG. 1 illustrates an iris sensing and acquisition system 100 according to one embodiment of the present invention. An array of cameras 105, 115 captures a plurality of images within a focus region 104. At least one of the images captured by the array of cameras contains a region having at least a portion of an iris of a subject 102.

In one embodiment, a wide-field-of-view (WFOV) camera 105 detects faces, finds eyes and identifies the region-of-interest (ROI) for iris while allowing a subject 102 to move around. The ROI information is sent to a selector 110 to control the selection of an array of narrow-field-of-view (NFOV) camera(s) 115 for capturing a plurality of iris images. In one embodiment, the plurality of iris images comprises a sequence of high resolution iris images. The array of NFOV cameras 115 may comprise fixed and/or pan-tilt-zoom cameras. In addition, a depth map of the ROI may be automatically estimated to assist the selection of NFOV cameras 115. The depth estimation can be accomplished in many ways, e.g., stereo camera, infrared, ultrasound, ladar. To increase the system flexibility, NFOV cameras with increased capturing range can be used. In one embodiment, an array of NFOV cameras 115 may be operable to implement the present invention without the use of WFOV camera(s) 105.

As the captured iris image sequence is from a moving person, it is important for the system to process the images sufficiently, including for example, noise reduction, image composition, and feature enhancement. The processed iris pictures are then sent to an iris recognition module 120 for matching and identification. To actively improve the signal-to-noise ratio (SNR) and enhance the quality of an acquired iris image, an illumination device 125, such as active, invisible infrared LED lighting with shutter controller 130 may be used. In addition, image quality control module (IQCM) 150 selects or enhances an iris image by combining multiple input images before feeding them into iris recognition module 120.

A processed iris image is fed into the iris recognition module 120 for feature extraction, pattern matching, and person identification. One skilled in the art would recognize that the features of selector 110 and modules 135, 140, 150 of the present invention could be implemented by recognizer 120.

An iris model database 145 is provided for use in the matching process. Database 145 contains iris images or extracted pattern features. The data from the iris model database 145 is used for iris pattern matching with iris images obtained by recognizer 120.

Figure 2:
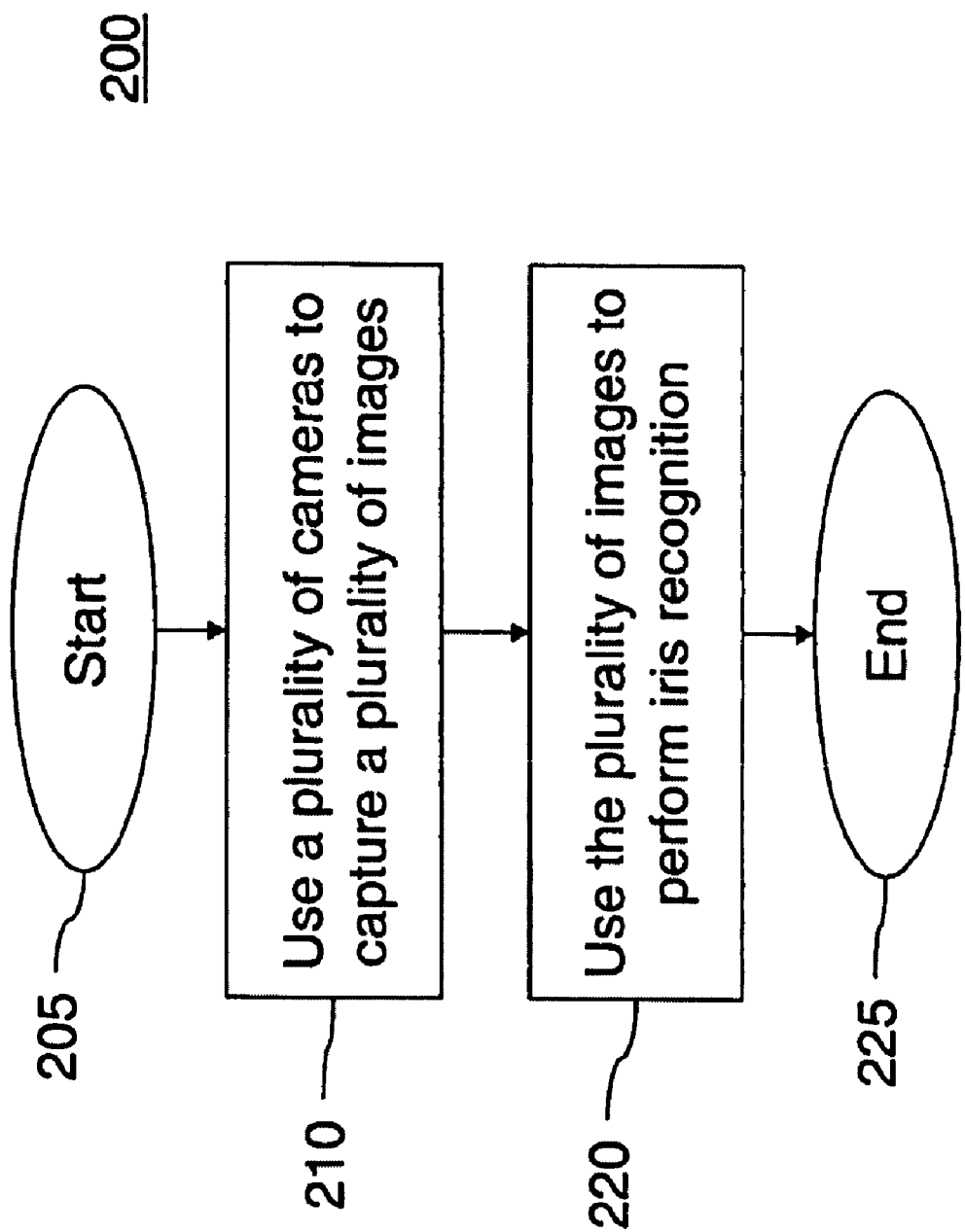
FIG. 2 illustrates a diagram in accordance with a method of the present invention.

FIG. 2 illustrates a diagram in accordance with a method 200 of the present invention. Method 200 starts in step 205 and proceeds to step 210.

In one embodiment, the iris image capturing task is divided into two modules—iris sensing and iris acquiring. The iris sensing module monitors a designated spatial region for any activities using the WFOV stereo pair. If an individual appears in the scene, a head-face-eye finder 135 is activated to locate the eyes and estimate the ROI (and depth) of the eyes. A high resolution iris image is then acquired by a chosen NFOV camera selected based on the ROI (and depth) information supplied from the sensing module.

In step 210, a plurality of cameras is used to capture a plurality of images. At least one of the plurality of images captured by the plurality of cameras contains at least a portion of an iris.

To reliably match and identify an iris pattern, a picture of an iris typically should be at least 150 pixels in diameter. With average diameter of an iris about 1.0 cm, a conventional camera with 512.times.512 resolution can only cover a spatial area of 3.0.times.3.0 cm.sup.2. In one embodiment, to overcome this limitation, an active vision system using WFOV cameras, an NFOV camera, and a pen/tilt unit may be used. However, this configuration uses slow mechanical motors, requires maintenance, and can significantly reduce the system response time. To overcome these limitations, the present invention uses a WFOV stereo camera pair and an array of static high resolution NFOV cameras to improve the spatial capturing range and the temporal response time (i.e., handling of human motion).

In one embodiment, a WFOV camera apparatus 105 catches and analyzes the wide field of view of the scene. Augmented with depth information (supplied from a separate depth detector or from the WFOV camera's own stereo image pair), the head-face-eye finder 135 detects the location of the head, face, and the eyes by searching through the images obtained from WFOV cameras 105.

The strategy for capturing an image of the iris is to first locate the head of the subject, then the face, and then the eye. This coarse-to-fine approach typically reduces image capture and processing requirements significantly. One such approach is to locate the subject at the closest depth (nearest) to the system and within the focus region. The depth of the user is recovered in real-time using stereo cameras. Subjects will be continually walking toward the portal and it would be necessary to ensure that a first subject will not be in front of the system and thereby obscuring the iris of a second subject. This can be accomplished using a study of the walking speed and separation distances of individuals, and by judicial placement of the system. For example, placement above the portal would ensure visibility in most circumstances.

The next step is to locate the position of the face. The face can be detected and tracked at a lower resolution compared to the iris, hence imposing much less constraint on image capturing and processing. The face can be detected using a generic face template comprising features for the nose, mouth, eyes, and cheeks. The position of the eye (recovered using the face detector) is then used to limit the ROI in which image capture and processing is performed to locate an image of the eye at the finer resolution that is required for iris recognition. Since the person is moving, a simple predictive model of human motion can be used in the hand-off from the coarse to fine resolution analysis in order to overcome latencies in the system. The model need not be accurate since it is used only to predict motion for the purpose of limiting image capturing and processing requirements.

WFOV lenses with appropriate aperture settings may be used. By using WFOV lenses, the WFOV stereo pair with conventional resolution is capable of covering a larger spatial region, such as a spatial cube ranging from 0.5 m*0.5 m*0.5 m to 1.0 m*1.0 m*1.0 m.

In one embodiment, to guarantee the sufficient coverage of a region, an array of NFOV high resolution cameras 115 are used. Since NFOV cameras have a much smaller depth of focus, the accurate estimate of depth is critical in acquiring high quality images. In one embodiment, depth information is obtained from the from the WFOV information. There are many methods for obtaining the depth information, i.e., using stereo cameras, time-of-flight (TOF) devices, infrared (IR) sensors, and ultrasonic sensors. To further improve the robustness of the system, some simple devices such as infrared-based occlusion detectors can be readily installed in a venue, e.g., a metal detector portal in an airport, to signal that the moving target is ready to enter a region of focus, e.g., focus region 104.

The calculated eye's ROIs (x, y, dx, dy) in the WFOV image are mapped into the local coordinate system on a NFOV camera array using ROI and camera ID module 140. The mapping results in new ROIs (cid, x', y', dx', dy') corresponding to an image in the NFOV cameras. The cid is the camera identifier for a camera in the NFOV array on which the iris is imaged. The mapping may be assisted by using the depth information. The mapping function may be obtained by a pre-calibration process in the form of a "Look-Up-Table" (LUT).

In the situation where an iris is located across the boundary on more than one NFOV camera, the WFOV apparatus is capable of specifying a sub ROI for each involved NFOV camera and sending the sub ROI to the NFOV apparatus for iris image acquiring.

The WFOV apparatus has motion tracking and stabilizing capability. This motion tracking and stabilizing capability may be used so that the motion of the head/face can be tracked and the ROIs for eyes can be updated in real-time.

A high resolution iris image is acquired by the NFOV camera apparatus. Using an array of high resolution cameras, the apparatus can cover a large sensing area so that the iris can be captured while the target is moving around.

The covering region depends on a camera's resolution, the viewing angle, and the depth of focus. In general, lenses used with high-resolution cameras will result in small depth-of-focus. Properly selecting the lenses for NFOV cameras allows for an extended focus range. To increase the capturing range, the present invention uses either 1) fast zooming lenses that could potentially increase the system response time, 2) multiple cameras covering overlapping areas especially along the Z-direction, or 3) a special optical encoder. Sufficient focus depth coverage guarantees the iris imaging quality while the target is moving towards or backwards from the NFOV cameras.

Mechanical lens focus mechanisms typically operate slowly. Therefore, a simple prediction model to set the lens focus at a series of "depth curtains" such that capture of fine resolution imagery of the iris is triggered once the subject passes through the depth curtain. The depth of the subject is recovered using real-time stereo analysis of the imagery from WFOV cameras.

An additional method for obtaining a focused image is to acquire multiple images as the person is walking through the depth curtain, and to select those images that are most in focus or produce a sharp image from a sequence of possibly blurry images.

The iris image acquisition on NFOV camera array 115 is ROI based. ROIs are generated from the WFOV camera module 105. Only pixels from ROI regions on NFOV cameras are acquired and transferred for further processing. The ROI-based iris image acquisition reduces system bandwidth requirements and adds the possibility for acquiring multiple iris images within a limited time period.

The NFOV selector module 110 takes the ROI information from the WFOV and associated depth information to decide which NFOV camera 115 to switch to and sets up a ROI for iris image acquiring. The module also generates a signal for illumination device 125 control. The illumination device may have a mixture of different wavelengths may have an "always on" setting or may be switched on and off in a synchronized manner with the camera shutter.

To cover an even larger area or reduce the system cost without significantly impacting the temporal response of the system, a combination of a tilt platform with a single row of a camera array may be a compromising solution. The row array of cameras covers a necessary horizontal spatial range for high-resolution image acquisition. The tilt platform provides one degree of freedom for cameras to scan irises for persons with different heights. In one embodiment, a mirror may be mounted on the platform to reflect images to the fixed camera row. In another embodiment, the camera row may be mounted on the platform directly. Since the mechanical portion has only one degree of freedom, the reliability will be increased.

In one embodiment, the NFOV apparatus also has the capability to directly detect faces/eyes. An array of NFOV cameras would be utilized. In this embodiment, each NFOV camera is operable to detect at least a portion of an iris in its respective field of view. In this embodiment, the NFOV array is operable to provide spatial coverage of a focus region. In addition, the NFOV array may be augmented with focal depth information. Focal depth information may be obtained from NFOV cameras using methods similar that of the WFOV apparatus. To ensure successful iris matching, a signal would be invoked only when eyes in good focus are detected. This can be achieved by applying a match filter along with certain user-designed specularity patterns.

In step 220, at least one of the plurality of images is processed to perform iris recognition. In one embodiment, processed iris images from the IQCM 150 are fed into the iris recognition module for feature extraction, pattern matching, and person identification. An iris model database 145 is provided for use in the matching process. The database contains iris images or extracted pattern features. The data from the iris model database 145 is used for iris pattern matching. Method 200 ends at step 225.

In one embodiment, controlled specularities are used to detect a pupil in a region of interest. As discussed in previous sections, one operational embodiment finds the head, then face, and then the eye using WFOV, and then uses NFOV to localize the iris. This operational embodiment is based on using normal images while abnormal image regions such as specularities are treated as outliers. However, the artifacts can be used if they can be controlled. For example, specularities have been used to find a human's pupil directly if the eyes are illuminated with near-infrared illuminators 125. By putting illuminators 125 along and off the camera axis, the bright-pupil effect and dark-pupil effect can be produced respectively. By turning two sets of illuminators on and off sequentially, reliable detection of bright pupils can be achieved without confusing those bright pupils with glints produced by corneal reflection of IR light.

Using controlled illuminators 125, the specularity can be used to detect the eye regions directly. Controlled illuminators 125 may also be integrated with the head-face-eye approach for speed and robustness within the WFOV and/or NFOV apparatus. In this embodiment, multiple light sources are modulated over time to help identify the location of the eye.

To date, existing implementations of a VSCIF have used either tokens or biometrics that require significant user interaction. These have limitations:
  Tokens can be lost or stolen
  Up-close biometrics require significant user interaction that can impede the flow of personnel in and out of the area
  Face recognition is much less reliable than iris recognition.
  IOM systems can be configured in a variety of ways to accommodate scenario needs. Some options include
  Portal style walk through systems
  Over a door walk through systems
  On the wall walkup or walk past systems.

In many scenarios of interest to the government, intelligence and military communities it is necessary to provide access to classified information at varying levels of classification. In many scenarios, this access is provided on computer displays that are housed in areas to which people with varying levels of classification must have access. This creates business process difficulties: if user A is working at the TS level and user B (who only has S level clearance) walks into the area, how do we make sure that the TS information that user A has access to will not be seen by user B?

Some entities are presently working on this problem from the standpoint of computer screen control. In particular, they are using the Multi-Level Security protocols to blank out windows on the computer display that are above the classification level for the least-cleared individual in the area.

An important factor for such systems is determining who is in the area.

Embodiments of the invention determine the population of the area by deploying the above-described iris recognition technology at each of a series of portals to the area. Individuals entering/leaving the area are constrained by physical or other control measures to pass through a portal. The portal itself may be part of an access control system, such as a turnstile or electrically locked door, that only allows authorized persons into the area. For example, although the VSCIF might allow persons with both first (TS) and second (S) level clearances to be present, it might not allow any persons with less than a second (S) level clearance to enter at all. The iris recognition technology recognizes the individuals entering and leaving and maintains a record of the current population of the room that can be linked to a database containing their security data.

The iris recognition systems described in U.S. patent application Ser. Nos. 11/334,968 and 11/364,300, the contents of which are hereby incorporated by reference herein, provide a mechanism for positively establishing identity of individuals entering or occupying a secure facility.

Some unique and beneficial properties of the above-described iris recognition approach with respect to the VSCIF application are that it 1) does not require contact or close proximity to the individual to be identified, or that the individual be stationary; 2) does not interfere with normal functioning of the workspace and can be made eyesafe for chronic exposure so that it can operate continuously to monitor area occupancy; 3) can be adapted to the specific coverage, stand-off requirements, and other conditions of varying installations; and 4) is applicable to the vast majority of individuals based solely on their unique and immutable anatomical characteristics.

Iris recognition systems can be configured in a variety of ways to accommodate scenario needs. Some options include
  Portal style walk through systems at VSCIF access points
  Over-a-door walk through systems at VSCIF access points
  Portal or over-a-door systems that control an access point by physically barring entry to unauthorized persons.
  On the wall walkup or walk past systems positioned either at VSCIF access points
  Walkup or walk past systems positioned throughout the VSCIF area to provide continuous assessment of VSCIF occupancy.

Figure 3:
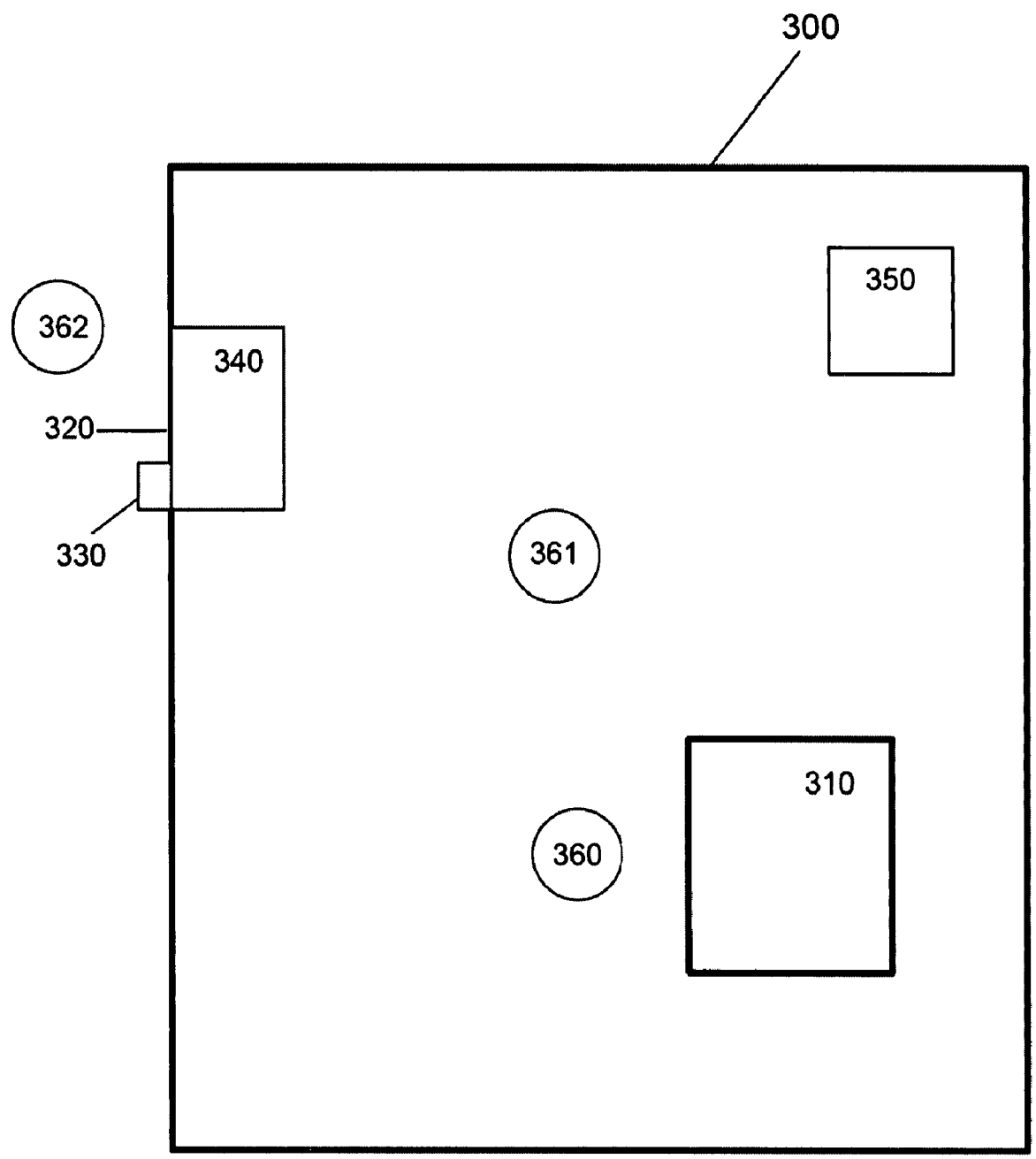
FIG. 3 illustrates an iris recognition system for a secure facility according to one embodiment of the present invention.

With reference to FIG. 3, there is shown an embodiment of the invention combine a virtual secure compartmentalized information facility (VSCIF) with the above-described iris recognition technologies to provide secure access to classified data on the basis of users' biometric identification. A VSCIF 300 includes a computer system 310 being viewed by a first user 360 having a first security level. First user 360 is identified by iris recognition system 350 (such as an iris recognition system as described above) and the display of computer system 310 is limited to displaying information (or program windows) that are appropriate for the first user's 360 security level. When second user 361, having a lower security level than the first user 360, enters the VSCIF 300, he or she is identified by iris recognition system 310, and the display of computer system 310 is modified such that only information (and program windows) appropriate for the second user's 361 security level are displayed.

In some embodiments, a doorway or portal 320 to the VSCIF 300 can include a portal iris recognition system 340 so that a third user 362 can be identified via iris recognition as he or she enters the VSCIF 300. In some embodiments, the portal 320 can include an entry blocking system 330 that will block third user 362 from entering the VSCIF 300 if the third user's 362 security level is not appropriate for information being displayed at computer system 310.

Figure 4:
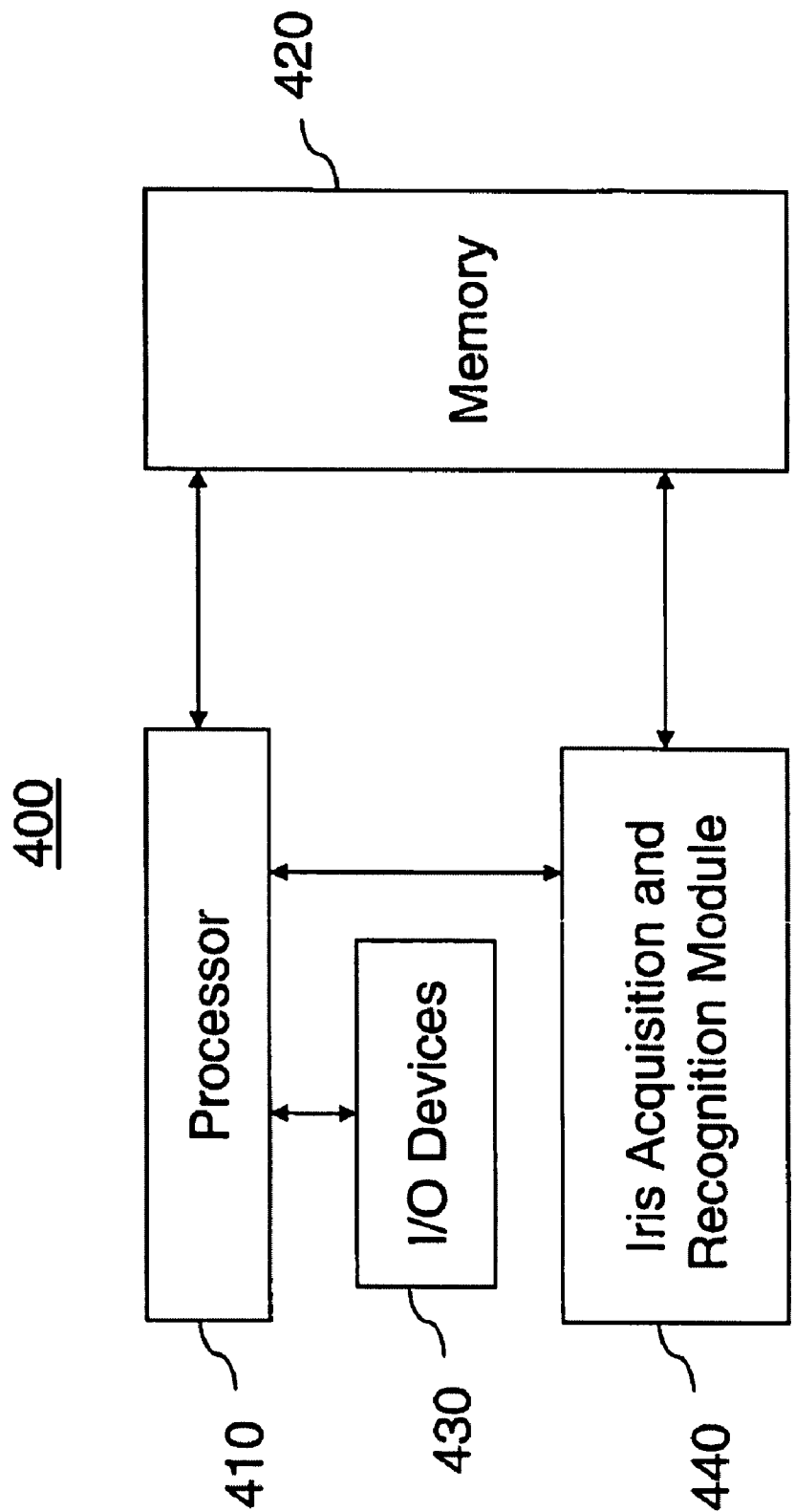
FIG. 4 illustrates a block diagram of an image processing device or system according to one embodiment of the present invention.

FIG. 4 illustrates a block diagram of an image processing device or system 400 of the present invention. Specifically, the system can be employed to process a plurality of images from a plurality of cameras to perform iris recognition. In one embodiment, the image processing device or system 400 is implemented using a general purpose computer or any other hardware equivalents.

Thus, image processing device or system 400 comprises a processor (CPU) 410, a memory 420, e.g., random access memory (RAM) and/or read only memory (ROM), an iris acquisition and recognition module 440, and various input/output devices 430, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the iris acquisition and recognition module 440 can be implemented as one or more physical devices that are coupled to the CPU 410 through a communication channel. Alternatively, the iris acquisition and recognition module 440 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 420 of the computer. As such, the iris acquisition and recognition module 440 (including associated data structures) of the present invention can be stored on a computer readable medium, e.g., RAM memory, magnetic or optical drive or diskette and the like.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A computer implemented method for performing iris recognition from at least one image, comprising:
   displaying, at a display of a computer system in a secure information facility, information that is appropriate for a first subject's security level;
   using a plurality of cameras to capture a plurality of images of a second subject where at least one of said images contains a region having at least a portion of an iris;
   processing, with a processor, at least one of said plurality of images to perform iris recognition;
   identifying, with the processor, the second subject by the iris recognition;
   determining, with the processor, the security level of the second subject from the second subject's identity; and
   modifying, with the processor, the display based on the security levels of the first and second subjects, wherein only that subset of the displayed information appropriate for the second subject's security level is displayed when the second subject has a different security level than the first subject.

2. The method of claim 1, wherein the information appropriate for the second subject is less than the information appropriate for the first subject.

3. The method of claim 2, further comprising the step of blanking portions of the display that are not appropriate for the for the security level of the second subject.

4. The method of claim 1, wherein the plurality of cameras comprises a plurality of wide field-of-view (WFOV) cameras and a plurality of narrow field-of-view (NFOV) cameras, wherein the step of using a plurality of cameras to capture a plurality of images of a second subject further comprises the steps of:
   finding the head, then the face, and then the eyes of the second subject using at least one of the plurality of WFOV cameras to determine a region of interest (ROL); and
   localizing the iris of the second subject from the ROI using at least one of the plurality of NFOV cameras.

5. The method of claim 4, further comprising the steps of:
   estimating a depth map of the ROI using the processor, and selecting at least one of the plurality of NFOV cameras using the depth map.

6. The method of claim 5, wherein the depth map is estimated using at least one of a stereo camera, an infrared camera, ultrasound, and ladar.

7. The method of claim 1, further comprising the steps of:
   setting a lens focus of at least one of the plurality of cameras at a series of depth curtains; and
   capturing fine resolution imagery of an iris when at least one of the first subject and the second subject passes through at least one of the depth curtains.

8. A system for performing iris recognition from at least one image, comprising:
   a display of a computer system in a secure information facility for displaying, information that is appropriate for a first subject's security level;
   a plurality of cameras for capturing a plurality of images of a subject where at least one of said images contains a region having at least a portion of an iris; and
   a processor:
      for processing at least one of said plurality of images to perform iris recognition;
      for identifying the second subject by the iris recognition;
      for determining the security level of the second subject from the second subject's identity; and
      for modifying the display based on the security levels of the first and second subjects, wherein only that subset of the displayed information appropriate for the second subject's security level is displayed when the second subject has a different security level than the first subject.

9. The system of claim 8, wherein the information appropriate for the second subject is less than the information appropriate for the first subject.

10. The system of claim 9, wherein the processor is further configured for blanking portions of the display that are not appropriate for the for the security level of the second subject.

11. The system of claim 8, wherein the plurality of cameras comprises a plurality of wide field-of-view (WFOV) cameras and a plurality of narrow field-of-view (NFOV) cameras, wherein at least one of the plurality of WFOV cameras is configured for finding the head, then the face, and then the eyes of the second subject to determine a region of interest (ROI); and wherein at least one of the plurality of NFOV cameras is configured for localizing the iris of the second subject from the ROI.

12. The system of claim 11, wherein the processor is further configured for:
   estimating a depth map of the ROI using the processor; and
   selecting at least one of the plurality of NFOV camera using the depth map.

13. The system of claim 12, wherein the depth map is estimated using at least one of a stereo camera, an infrared camera, ultrasound, and ladar.

14. The system of claim 8, wherein the processor is further configured for setting a lens focus of at least one of the plurality of cameras at a series of depth curtains; and wherein at least one of the plurality of cameras is further configured for capturing fine resolution imagery of an iris when at least one of the first subject and the second subject passes through at least one of the depth curtains.

15. A computer-readable medium having stored thereon a plurality of instructions, the plurality of instructions including instructions which, when executed by a processor, cause the processor to perform the steps of a method for performing iris recognition from at least one image, comprising:
   displaying, at a display of a computer system in a secure information facility, information that is appropriate for a first subject's security level;
   using a plurality of cameras to capture a plurality of images of a second subject where at least one of said images contains a region having at least a portion of an iris;
   processing at least one of said plurality of images to perform iris recognition;
   identifying the second subject by the iris recognition;
   determining the security level of the second subject from the second subject's identity; and
   modifying the display based on the security levels of the first and second subjects, wherein only that subset of the displayed information appropriate for the second subject's security level is displayed when the second subject has a different security level than the first subject.

16. The computer-readable medium of claim 15, wherein the information appropriate for the second subject is less than the information appropriate for the first subject.

17. The computer-readable medium of claim 16, further comprising the step of blanking portions of the display that are not appropriate for the for the security level of the second subject.

18. The computer-readable medium of claim 15, wherein the plurality of cameras comprises a plurality of wide field-of-view (WFOV) cameras and a plurality of narrow field-of-view (NFOV) cameras, wherein the step of using a plurality of cameras to capture a plurality of images of a second subject further comprises the steps of:
   finding the head, then the face, and then the eyes of the second subject using at least one of the plurality of WFOV cameras to determine a region of interest (ROI); and
   localizing the iris of the second subject from the ROI using at least one of the plurality of NFOV cameras.

19. The computer-readable medium of claim 18, further comprising the steps of:
   estimating a depth map of the ROI using the processor; and
   selecting at least one of the plurality of the NFOV cameras using the depth map.

20. The computer-readable medium of claim 19, wherein the depth map is estimated using at least one of a stereo camera, an infrared camera, ultrasound, and ladar.

21. The computer-readable medium of claim 15, further comprising the steps of:
   setting a lens focus of at least one of the plurality of cameras at a series of depth curtains; and capturing fine resolution imagery of an iris when at least one of the first subject and the second subject passes through at least one of the depth curtains.

* * * * *